United States Patent [19]

Swinea, Jr.

[11] 3,714,519

[45] Jan. 30, 1973

[54] SOLID STATE TIMER

[76] Inventor: Jessie D. Swinea, Jr., 222 W. LaSalle, Royal Oak, Mich. 48073

[22] Filed: Oct. 5, 1970

[21] Appl. No.: 78,007

[52] U.S. Cl. ................................317/141 S, 307/294

[51] Int. Cl. ..............................................H01h 47/18

[58] Field of Search .........317/141 S, 142 R; 307/294

[56] References Cited

UNITED STATES PATENTS

| | | | |
|---|---|---|---|
| 3,377,532 | 4/1968 | Lane et al. | 317/142 |
| 3,391,305 | 7/1968 | Bradwin et al. | 317/141 S |
| 3,392,350 | 7/1968 | Griffin | 317/141 S |

*Primary Examiner*—L. T. Hix
*Attorney*—Oltsch & Knoblock

[57] ABSTRACT

A solid state timer powered by a direct current source and including means for generating pulses at timed intervals for delivery to a shift register including a series of flip-flop solid state units and operative after application thereto of a predetermined number of pulses to change its condition and thereby activate a controlled unit. Reset means respond to each activation of said shift register means to restore it to condition to repeat its operation.

18 Claims, 6 Drawing Figures

INVENTOR.
JESSIE D. SWINEA JR.
BY
Oltsch & Knoblock
ATTORNEYS

INVENTOR.
JESSIE D. SWINEA JR.

BY Oltsch & Knoblock

ATTORNEYS

INVENTOR.
JESSIE D. SWINEA JR.
BY Oltsch & Knoblock
ATTORNEYS

Fig. 6

| | IC 92 | IC 93 | IC 94 | IC 95 | IC 96 | IC 97 |
|---|---|---|---|---|---|---|
| 1 | 1 | | | | | |
| 2 | | 1 | | | | |
| 3 | 1 | 1 | | | | |
| 4 | | | 1 | | | |
| 5 | 1 | | 1 | | | |
| 6 | | 1 | 1 | | | |
| 7 | 1 | 1 | 1 | | | |
| 8 | | | | 1 | | |
| 9 | 1 | | | 1 | | |
| 10 | | 1 | | 1 | | |
| 11 | 1 | 1 | | 1 | | |
| 12 | | | 1 | 1 | | |
| 13 | 1 | | 1 | 1 | | |
| 14 | | 1 | 1 | 1 | | |
| 15 | 1 | 1 | 1 | 1 | | |
| 16 | | | | | 1 | |
| 17 | 1 | | | | 1 | |
| 18 | | 1 | | | 1 | |
| 19 | 1 | 1 | | | 1 | |
| 20 | | | 1 | | 1 | |
| 21 | 1 | | 1 | | 1 | |
| 22 | | 1 | 1 | | 1 | |
| 23 | 1 | 1 | 1 | | 1 | |
| 24 | | | | 1 | 1 | |
| 25 | 1 | | | 1 | 1 | |
| 26 | | 1 | | 1 | 1 | |
| 27 | 1 | 1 | | 1 | 1 | |
| 28 | | | 1 | 1 | 1 | |
| 29 | 1 | | 1 | 1 | 1 | |
| 30 | | 1 | 1 | 1 | 1 | |
| 31 | 1 | 1 | 1 | 1 | 1 | |
| 32 | | | | | | 1 |

INVENTOR
JESSIE D. SWINEA JR.
BY
Oltsch & Knoblock
ATTORNEYS

SOLID STATE TIMER

This invention relates to a solid state timer, namely, a timing device whose components consist of electrical and solid state electronic parts, such as diodes, transistors and integrated circuits.

Heretofore, timers of this character have been able to function to measure limited or very short intervals of time only, and consequently have had limited usage, application and utility.

It is the primary object of this invention to provide a timer which is useful in timing the operation of controlled elements for periodic operation at selected intervals of elapsed time in a wide range extending from a few seconds to a number of hours, such as 24 hours.

A further object is to provide a timer of this character which can operate on direct current in a wide voltage range, such as from 5 to 48 volts, and which maintains the proper voltage for the circuit at all times.

A further object is to provide a device of this character having high accuracy, which is operable in any temperature range and which is trouble free in operation.

A further object is to provide a two-speed clocked trigger circuit to generate a positive operating pulse at a predetermined rate.

A further object is to provide a two-speed clocked trigger circuit with selectively operable means to accelerate the timer sequence for testing purposes.

A further object is to provide a device of this character wherein an inverter acts as a pulse shaper.

A further object is to provide a device of this character wherein an electronic shift register responds to the pulses from a clock trigger circuit to change its condition and energize a control element when a selected number of pulses occur.

A further object is to provide a device of this character with a sequential logic circuit which performs counting, resetting and lock-out functions.

Other objects will be apparent from the following specification.

In the drawings:

FIG. 6 is a chart illustrating progressive functioning of the electronic shift register.

Figures 4, 5:
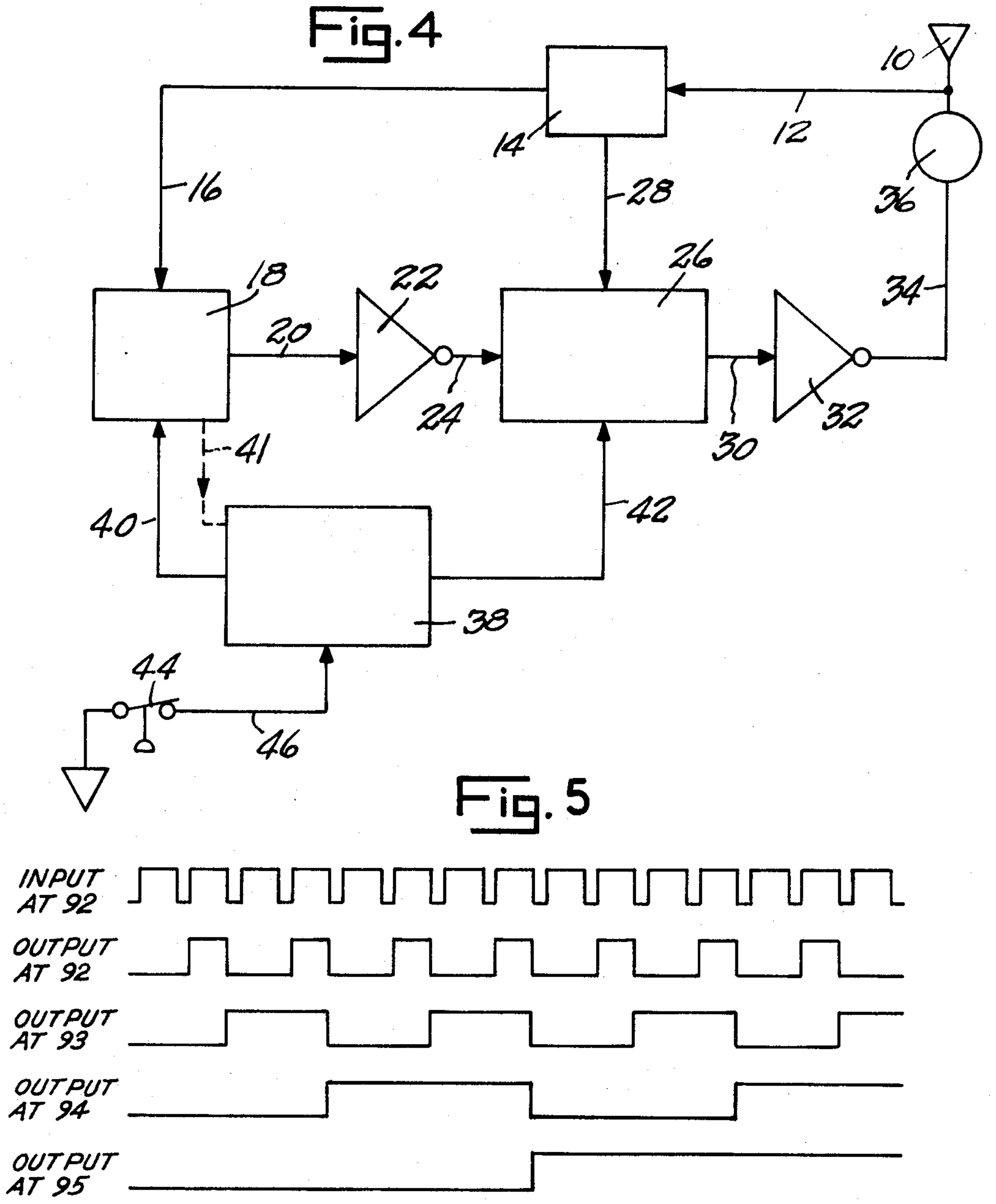
FIG. 4 is a block diagram of one embodiment of the invention.
FIG. 5 illustrates the pulse switching wave forms at different points of the shift register.

Referring to the drawings which illustrate the preferred embodiment of the invention, and particularly to FIG. 4, the numeral 10 designates a source of direct current connected by conductor 12 to line voltage regulating means 14. Line voltage regulating means 14 is connected by a conductor 16 with a two-speed clocked trigger circuit 18. The output of the clocked trigger circuit 18 is directed by conductor means 20 to pulse preparation and phase inversion means 22 whose output is delivered by conductor means 24 to shift register means 26. Conductor means 28 also provide a connection between the line voltage regulating means 14 and the shift register means 26. The output of the shift register means is delivered by a conductor 30 to buffer means 32 serving as an inverter and power amplifier whose output is delivered by conductor 34 to a solenoid, relay or other means 36 to actuate the mechanism which is controlled periodically at predetermined intervals by the timer. A sequential logic or reset means 38 is connected to the clocked trigger circuit 18 at conductor 40 or 41 and is connected by conductor 42 with the shift register means 26. In some applications, a test switch 44 may be connected in a line 46 extending to the sequential logic or reset means.

Figure 3:
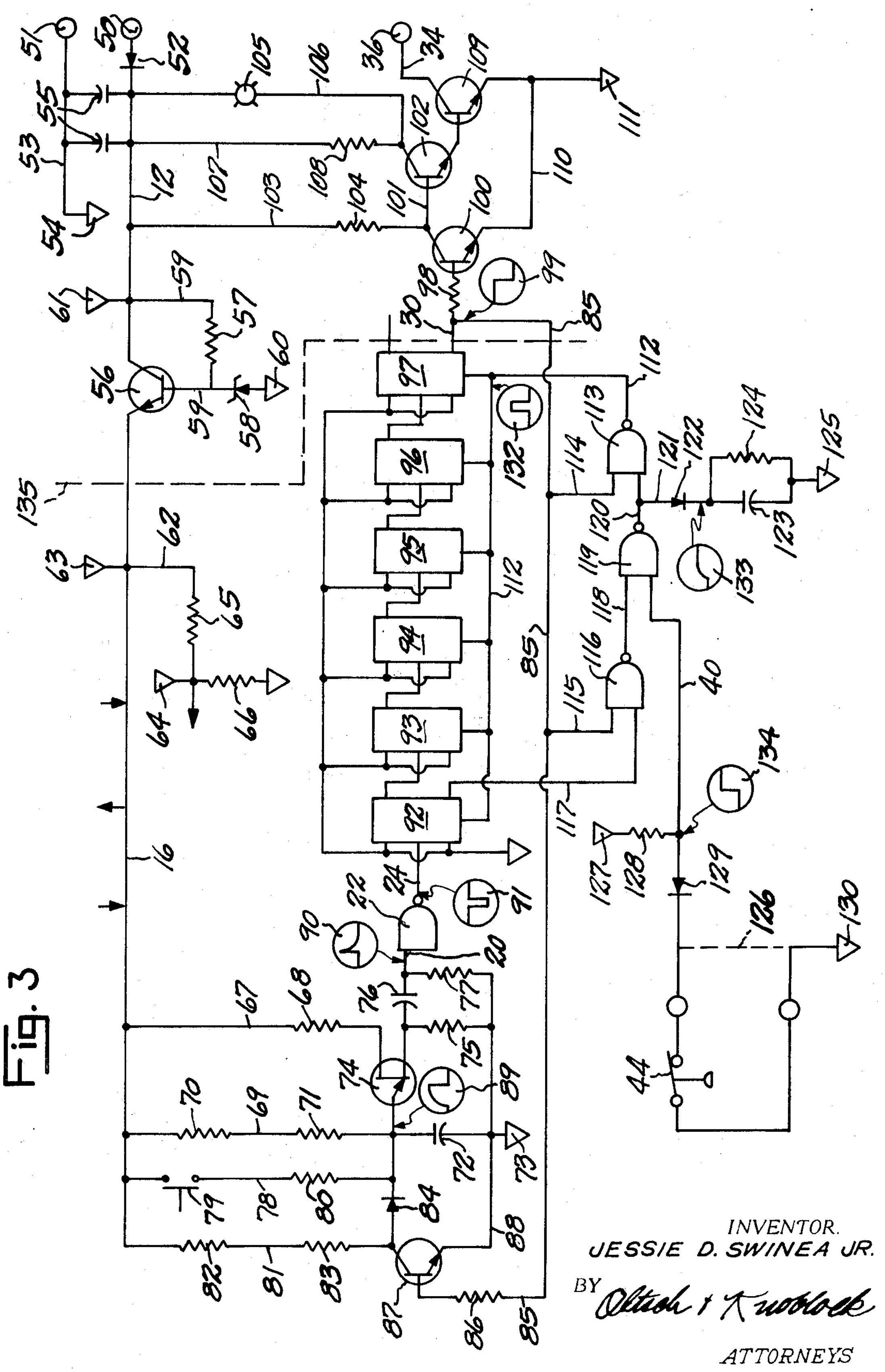
FIG. 3 is a wiring diagram illustrating one embodiment of the invention.

An exemplary operating circuit of the device described above is illustrated in FIG. 3 wherein 50 designates the positive terminal and 51 the negative terminal of a direct current power source. Lead 12 connected with the positive terminal 50 has interposed therein a diode 52 which serves as a polarity protector. A conductor 53 connects the negative terminal 51 to ground at 54. A pair of capacitors 55 connected across conductors 12 and 53 perform the function of line filtering.

A transistor 56 is connected in line 12 and cooperates with resistor 57 and diode 58 connected in a lead 59 extending to the base of the transistor 56 and grounded at 60 and connected with a power source 61. The portion of the circuit including transistor 56, resistor 57 and diode 58, serves as or constitutes the line voltage regulator means 14.

A branch conductor 62 connected with low voltage sources 63 and 64 has interposed therein resistors 65 and 66 which are so arranged as to provide a voltage divider to supply a selected low voltage to the integrated circuit.

A conductor 16 leading from the output of the transistor 56 has branching therefrom a lead 67 having a resistor 68 interposed therein and a lead 69 having resistors 70 and 71 interposed therein in series. Lead 69 has capacitor 72 connected therein and extends to ground at 73. A unijunction transistor 74 is connected to leads 67 and 69. The output of the unijunction transistor 74 is connected to resistor 75, capacitor 76 and resistor 77. Resistors 68, 70, 71, 75, and 77 and capacitors 72 and 76, and transistor 74 act as a clock pulse generator. The frequency rate of the generated pulse is controlled by the time constant of resistors 70 and 71 and capacitor 72.

A lead 78 connected to conductor 16 in parallel to lead 69 has a pushbutton switch 79 and a resistor 80 interposed therein and is connected to the supply lead for the transistor 74. Lead 78 acts as a parallel charging path for capacitor 72 when switch 79 is closed and increases the pulse rate of transistor 74 to provide a test position for the timing apparatus.

A lead 81 is connected to conductor 16 in parallel to lead 78 and has interposed therein resistors 82 and 83 arranged in series and is connected with the feed line to the transistor 74 at a part having a diode 84 interposed therein. A lead 85 has interposed therein a resistor 86 and is connected to the base of a transistor 87 which is connected to the input of transistor 74 through the diode 84 and is connected by lead 88 to the resistors 75, 77. The resistors 82, 83 and 86 and transistor 87 and diode 84 provide still another charging path or second supply line for the capacitor 72. The parts numbered 67 to 88 inclusive constitute the two-speed clocked trigger circuit 18.

The wave form at the input of the transistor 74 is illustrated at 89 and the wave form of the output of the two-speed clocked trigger 18 is illustrated at 90. The output of transistor 74 is fed to a transistor inverter which constitutes the pulse preparation and phase inversion means 22 and which produces at its output the wave form illustrated at 91.

The shift register means 26 constitutes a cascade of a selected number of J, IC, flip-flop units, such as units 92, 93, 94, 95, 96 and 97, connected in series and energized by sources 63 and 64. The connection of the units is such that the output terminal of each unit is connected to the input terminal of the next unit of the cascade or series. Thus each flip-flop unit triggers on a negative transition only, and a dividing down of input clock pulses is obtained. The switching wave forms occurring at early stages of the shift register, which is here illustrated as a 32-bit shift register, are illustrated in FIG. 5 wherein the uppermost wave pattern illustrates the input to the flip-flop 92; the second wave pattern illustrates the output of flip-flop 92; the third wave pattern indicates the output of flip-flop 93; the fourth wave pattern illustrates the output at flip-flop 94; and the fifth wave pattern illustrates the output of flip-flop 95.

In a 32-bit shift register, whose progressive action at different units is charted in FIG. 6, after 32 consecutive negative transitions or pulses in lead 24, the voltage in output conductor 30 and in resistor 98 in the conductor falls to or near ground level, as illustrated schematically at 99. Conductor 30 is connected to the base of transistor 100. During the 32 consecutive negative transitions occurring in the progressive energization of shift register 26 before its output falls, the transistor 100 is held at or near saturation by a high output from the final flip-flop unit 97.

A lead 101 connects transistor 100 to the base of a transistor 102. Lead 101 is connected by lead 103 with conductor 12 and has resistor 104 interposed therein. When transistor 100 shuts off, the voltage on the base of resistor 104 begins to increase and transistor 102 is turned on by current in line 103 passing through resistor 104. The energization of transistor 102 energizes a lamp 105 in lead 106 connected to conductor 12. A lead 107 having a resistor 108 therein also connects the transistor 102 with lead 12. A third transistor 109 has its base connected to transistor 102 to be energized thereby and discharges current to load 36 such as a solenoid or relay, connected thereto by lead 34 and serving to actuate the mechanism which is being timed, such as a periodically operating lubricating mechanism for an internal combustion engine. This charge or energization of load 36 continues until the condition at the output terminal of the last flip-flop unit 97 of the cascade changes, or until reset pulse is applied to the reset line to reset the shift register. It will be observed that the transistors 100 and 109 are connected to a common lead 110 extending to ground at 111. The transistors 100, 102 and 109 together with their associated parts, such as resistor 108, cooperate to form the buffer means 32.

It will be observed that lead 85 is connected to conductor 30 between the final flip-flop unit 97 and transistor 100. Thus, when the negative transition occurs at the output of the final flip-flop unit 97 of the shift register 26, which turns off or drops the voltage applied to transistor 100, the same voltage drop is transmitted through lead 85 and resistor 86 to the base of transistor 87. This results in creating a new charging path for capacitor 72 for a new pulse generating rate.

Each of the cascade or flip-flop units constituting the shift register 26 has a terminal connected to a common lead 112 of a two-step inverter 113 whose input is connected by lead 114 with lead 85. A lead 115, also connected to lead 85, extends to the input terminal of a two-step inverter 116 which also is connected by lead 117 to a terminal of the first flip-flop unit 92 of the cascade, and by a lead 118 with an inverter 119 which is connected by lead 120 with inverter 113. A lead 121 connected to lead 120 has interposed therein a diode 122 and parallel leads in which capacitor 123 and resistor 124 are connected and which has a ground at 125. A lead 40 is connected to inverter 119 and to the DC power source 127 with an associated resistor 128. Lead 40 has a diode 129 interposed therein and is connected to ground 130. A pressure switch 44 is interposed in lead 40.

When the final flip-flop unit of the cascade or shift register, such as unit 97, turns off as previously explained, a negative potential is applied to inverters 113 and 116. These inverters are two-step inverters which require two identical negative inputs to get a positive output. The two inverters 113 and 116 cooperate with diode 122, capacitor 123 and resistor 124, and with resistor 128, diode 129 and the pressure switch 44 to perform the reset function and reset the timer at the end of a timing cycle. Diode 122, capacitor 123 and resistor 124 also perform a slow-down and prevent a race condition or a false count when power is applied.

The timer may be reset by opening of the pressure switch 44 or by a positive transition on the terminal of inverter 116 connected with lead 117 occurring while the terminal of inverter 116 connected to lead 115 is in a low state. This causes a positive output from inverter 119 in lead 120 and in the input terminal of inverter 113 with which lead 120 is connected. This positive output at inverters 113 and 119 occurring while the terminal of inverter 113 connected with lead 114 is held low causes a positive transition or impulse in lead 112, as illustrated schematically at 132. It will be observed in FIG. 3 that the conditions occurring in leads 121 and 40 are illustrated at 133 and 134, wherein 133 indicates a power increase condition and 134 indicates an increasing pressure condition. The impulse supplied to line 112 from inverter 113 is received by all of the flip-flop units in the cascade of the shift register and resets them to their original state, thereby setting the complete timer to zero ready for a new counting or timing cycle.

It will be understood that the number of flip-flop units utilized in the shift register will depend upon the interval of time at which the solenoid or other member 36 controlling the timing of the controlled machine is to be energized. The manner in which the flip-flop units function to control time is illustrated in the chart in FIG. 6. It will be evident from this chart that, as the number of flip-flop units in the cascade increases, the time elapsed before discharge of the final unit in the cascade increases in geometric progression. Consequently, even though the time interval of energization of the first flip-flop unit of the cascade is small, as only a fraction of a second, nevertheless a cascade totally measuring hours or as much as 24 hours can be achieved by the use of a reasonable number of flip-flops in the shift register. It will be appreciated, of course, that the time constant of successive pulses being measured at the output of the unijunction transistor 74 is controlled by the values of the resistors 70 and 71 and the capacitor 72.

Figure 1:
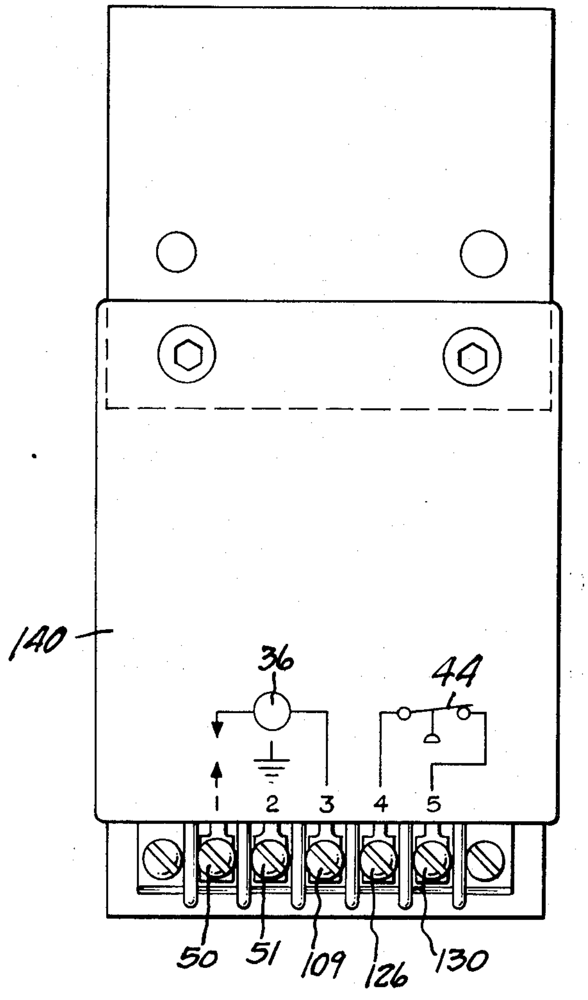
FIG. 1 is a plan view of one embodiment of the invention with a schematic illustration of the electrical connections to be made therein.
Figure 2:
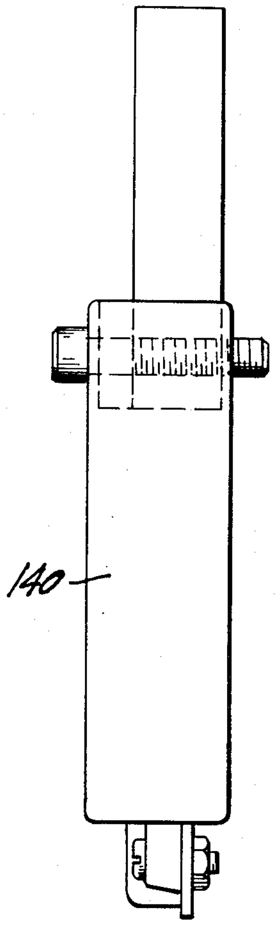
FIG. 2 is an edge view of the device seen in FIG. 1.

The arrangement is particularly well suited for compact fabrication and particularly for encapsulation. Thus, the components in the circuit in FIG. 3 at the left of the broken line 135 are well suited for encapsulation, whereby a compact arrangement is provided as illustrated in FIG. 1 at 140. In this construction various terminals are illustrated, for electrical connection to ground, to power source and to activating member 36. Also pushbutton switch 44 is illustrated. It will be understood that pushbutton switch 44 is optional. In the event switch 44 is omitted, lead 126 will connect lead 40 directly to ground 130.

In a characteristic timing device, resistors 70 and 71, in cooperation with capacitor 72, may be calibrated for seven second interval time. Resistor 83 can be calibrated for thirty second delay until solenoid 36 is "on" and during which time it shunts or by-passes resistors 70 and 71. Where used, the pushbutton switch 44 provides means to accelerate the timer sequence when energized.

The line voltage regulator 14 serves to maintain a proper voltage for the circuit at all times, regardless of the voltage supplied at terminal 50. The two-speed clock trigger circuit 18 generates a positive going pulse at a predetermined rate. The inverter 22 acts as a pulse shaper and inverter. The 32-bit shift register 26 counts pulses of the clock trigger circuit 18. The output of the shift register 26 changes state to energize the buffer 32 every time a predetermined number of pulses has been applied to and counted by the shift register 26. The buffer 32 acts as an inverter and power amplifier to drive the relay, solenoid or other control component 36. The sequential logic 38 initiates reset and serves a lock-out function. The pressure switch 44 is preferably of the normally closed type that will open when adequate pressure is applied, thereby resetting the timer.

While the preferred embodiment of the invention has been illustrated and described, it will be understood that changes may be made therein without departing from the spirit of the invention.

What I claim is:

1. A solid state timer comprising a closed trigger circuit including a uni-junction transistor and operable for generating pulses at timed intervals of duration of at least multiple seconds and having a supply line including a resistor and a charging capacitor, a shift register circuit including a plurality of series-connected solid state flip-flop units, said shift register circuit being responsive to said trigger circuit pulses and operable to produce an output signal after a selected number of pulses and a duration of multiple minutes or hours, intermittently operable control means responsive to each output signal, and means for resetting said shift register circuit after delivery of each output signal and including means for changing the time of timed intervals by means providing a new and additional charging path for said clocked trigger circuit and including a second supply line having a resistor connected in parallel to said first supply line, a diode preventing draining of the charging capacitor for said transistor, and switch means responsive to said output signal for activating said additional charging path to said uni-junction transistor through said diode.

2. A solid state timer as defined in claim 1, including a direct current power source and a line voltage regulator feeding said clocked trigger circuit.

3. A solid state timer as defined in claim 1, wherein said clocked trigger circuit produces pulses at a selected rate when energized by said first supply line and at a different rate when energized by both supply lines.

4. A solid state timer as defined in claim 3, wherein said clocked trigger circuit includes a normally inoperative branch circuit in parallel thereto and having a normally open switch and resistance means different from said first named resistance means and cooperating with said capacitor and transistor to produce said pulses at a third rate.

5. A solid state timer as defined in claim 1, wherein said clocked trigger circuit and resetting means includes a unijunction transistor and alternately operable means including said first and second supply lines for delivering a charge to said transistor at selected alternate and different intervals of time.

6. A solid state timer as defined in claim 1, wherein said clocked trigger circuit includes a uni-junction transistor, and an inverter interposed between said transistor and said shift register circuit to shape pulses delivered to said shift register circuit.

7. A solid state timer as defined in claim 1, wherein said control means includes a transistor and a load.

8. A solid state timer as defined in claim 1, wherein said control means includes a group of transistors connected to a load to activate a current path from a power source to said load.

9. A solid state timer as defined in claim 3, wherein said reset means includes a lead connecting the output of the shift register with said second supply line to said clocked trigger circuit and having a transistor controlling said second supply line.

10. A solid state timer as defined in claim 1, wherein said shift register circuit normally delivers a charge to a transistor forming part of said control means, said shift register circuit responding only to negative transitions and reducing the voltage applied to the transistor of said control means when said selected number of pulses have been applied thereto.

11. A solid state timer as defined in claim 1, and a buffer means interposed between the output of said shift register circuit and a load member of the type including relays and solenoids.

12. A solid state timer as defined in claim 1, wherein an inverter means connected to be energized by the output of said shift register circuit upon passage of said selected number of pulses through said shift register circuit is connected to a terminal of each flip-flop unit.

13. A solid state timer as defined in claim 12, and means connected to said inverter means and including a diode, a capacitor and a resistor functioning to prevent a race condition when power is applied thereto.

14. A solid state timer as defined in claim 12, wherein a plurality of inverters are connected to be energized by the output of said shift register circuit, one of said inverters having a terminal connected to a terminal of the initial flip-flop unit of said shift register circuit, another inverter being connected to the reset terminals of said flip-flop units of said shift register circuit to supply a resetting impulse, and means for imparting a positive impulse to said last named inverter while the state of the first inverter is low, for the purpose of resetting said flip-flop units.

15. A solid state timer as defined in claim 1, wherein said flip-flop units are so connected that the time lapses between energization of successive flip-flop units of said shift register increases in geometric progression.

16. A solid state timer as defined in claim 1, wherein said trigger circuit, shift register circuit and resetting means are encapsulated.

17. A solid state timer as defined in claim 12 and second means cooperating with said clocked trigger circuit for resetting said shift register.

18. A solid state timer as defined in claim 17, wherein said last named means comprise an inverter, a resistor, a diode, and a manually operable switch.

* * * * *